US007370398B2

(12) United States Patent
Gosis et al.

(10) Patent No.: US 7,370,398 B2
(45) Date of Patent: May 13, 2008

(54) METHOD OF CALIBRATING A CLAMPING MECHANISM

(75) Inventors: Anatoly Gosis, Palatine, IL (US); Richard L. Edwards, Cary, IL (US); Howard W. Kimball, Canal Winchester, OH (US); Anthony Brent Marshall, Killeen, TX (US)

(73) Assignee: Illinois Tool Works Inc., Glenview, IL (US)

( * ) Notice: Subject to any disclaimer, the term of this patent is extended or adjusted under 35 U.S.C. 154(b) by 542 days.

(21) Appl. No.: 11/107,755

(22) Filed: Apr. 18, 2005

(65) Prior Publication Data

US 2006/0231724 A1 Oct. 19, 2006

(51) Int. Cl.
*B23Q 7/00* (2006.01)
*B25B 5/00* (2006.01)

(52) U.S. Cl. .............................. 29/407.01; 29/407.05; 29/407.08; 29/559; 29/281.1; 73/1.01; 269/236

(58) Field of Classification Search ............ 29/407.01, 29/407.05, 407.08, 559, 257, 261, 262, 281.1, 29/281.3; 73/1.01, 1.79; 269/134, 152, 269/236, 237, 289 R
See application file for complete search history.

(56) References Cited

U.S. PATENT DOCUMENTS

| | | | | | |
|---|---|---|---|---|---|
| 1,502,377 | A | * | 7/1924 | Davies | 425/175 |
| 1,979,793 | A | * | 11/1934 | Chalmers | 29/281.1 |
| 2,815,052 | A | * | 12/1957 | Krasnow | 269/31 |
| 3,697,060 | A | * | 10/1972 | Kulson | 269/228 |
| 3,964,738 | A | * | 6/1976 | Owen | 269/221 |
| 5,860,639 | A | * | 1/1999 | Fraser | 269/236 |
| 6,116,588 | A | * | 9/2000 | Yamane | 269/228 |
| 6,817,603 | B2 | * | 11/2004 | Kofod | 269/228 |

* cited by examiner

*Primary Examiner*—Jermie E. Cozart
(74) *Attorney, Agent, or Firm*—Steven W. Weinrieb

(57) ABSTRACT

A new and improved method for calibrating workpiece clamping mechanisms such that once a particular clamping mechanism is calibrated with respect to a particular workpiece to be clamped upon a support surface, the clamping mechanism will always clamp the workpiece with a predetermined, precisely repeatable clamping force. In addition, the method of the present invention may be utilized in conjunction with the calibration of a plurality of clamping mechanisms so as to enable the plurality of clamping mechanisms to always generate the same precise clamping force whereby the multiple clamping mechanisms, utilized to clamp a single workpiece upon a support surface, can in fact clamp different regions of the single workpiece with precisely the same predetermined clamping force such that all regions of the single workpiece are in fact securely clamped.

10 Claims, 3 Drawing Sheets

METHOD OF CALIBRATING A CLAMPING MECHANISM

FIELD OF THE INVENTION

The present invention relates generally to clamping mechanisms for securing workpieces upon a work table or support surface, and more particularly to a new and improved method for calibrating workpiece clamping mechanisms such that once a particular clamping mechanism is in fact positionally adjusted or calibrated with respect to, or in connection with, a particular workpiece to be clamped, the clamping mechanism will always clamp the workpiece with a predetermined, precisely repeatable clamping force. In addition, the method of the present invention may be utilized in conjunction with the calibration of a plurality of clamping mechanisms so as to enable the plurality of clamping mechanisms to be calibrated in such a manner that all of the clamping mechanism will always exhibit or generate the same precise clamping force whereby multiple clamping mechanisms, utilized to clamp a single workpiece upon a work table or support surface, can in fact clamp different regions of the single workpiece with precisely the same predetermined clamping force such that all regions of the single workpiece are in fact securely clamped.

BACKGROUND OF THE INVENTION

Various types of clamping mechanisms, for securing workpieces upon, for example, a work table or a workpiece support surface, are of course well known. One well-known type of clamping mechanism comprises a screw-type clamping mechanism which comprises an internally threaded bracket member disposed a predetermined distance above the work table or workpiece support surface, and an externally threaded rod or threaded shank member which is threadedly disposed internally within the bracket member. The threaded rod or threaded shank member has a head portion, which is adapted to be manually grasped, and a distal end or tip portion which is adapted to engage, or be disposed in contact with, the workpiece. Accordingly, when the head portion is manually rotated, the threaded rod or threaded shank member is threadedly advanced relative to the bracket member whereby the end or tip portion will in fact be advanced into engagement or contact with the workpiece. Continued rotation of the head portion will of course continue to effectively advance the threaded rod or threaded shank member, and the end or tip portion thereof, whereby the end or tip portion will be forced into engagement or contact with the workpiece with ever-increasing levels or degrees of force or pressure. It can readily be appreciated, however, that this mode of operation in fact creates an operative problem, namely, that the amount, or level, or degree of pressure, or force, exerted upon the workpiece, so as to in fact securely clamp the workpiece in a fixed state upon the work table or workpiece support surface, is substantially subjective and virtually unknown and therefore cannot be precisely predetermined or controlled.

Accordingly, still further, when a plurality of such clamping mechanisms are engaged or disposed in contact with different regions or different areas of a single workpiece so as to simultaneously or collectively fixedly secure the single workpiece upon the work table or workpiece support table, it can readily be appreciated that it often happens that the various different clamping mechanisms are effectively tightened to different extents, or to different degrees, whereby, in turn, different force or different pressure levels are exerted upon the different regions or the different areas of the workpiece which are respectively engaged by means of the different clamping mechanisms. It can therefore be readily appreciated still further that these different force or pressure levels, as exerted upon the different regions or the different areas of the workpiece, render the different forces or different pressure levels, as exerted upon the different regions or the different areas of the workpiece, non-uniform whereby the different regions or different areas of the workpiece will not in fact be fixedly secured upon the work table, or upon the workpiece support surface, to the same degree. Accordingly, when fabrication processes are to be performed upon the different regions or different areas of the workpiece, the workpiece may tend to move or undergo vibration such that the fabrication process is not able to be performed in a precisely controlled manner.

A need therefore exists in the art for a new and improved method for calibrating workpiece clamping mechanisms such that once a particular clamping mechanism is in fact positionally adjusted or calibrated with respect to, or in connection with, a particular workpiece to be clamped, not only will the particular clamping mechanism always clamp the workpiece with a predetermined, precisely repeatable clamping force, but in addition, the method of the present invention may be utilized in conjunction with the calibration of a plurality of clamping mechanisms so as to enable the plurality of clamping mechanisms to be calibrated in such a manner that all of the clamping mechanism will always exhibit or generate the same precise clamping force whereby the multiple clamping mechanisms, utilized to clamp a single workpiece upon a work table or support surface, can in fact clamp different regions of the single workpiece with precisely the same predetermined clamping force such that all regions of the single workpiece will in fact be securely clamped.

SUMMARY OF THE INVENTION

The foregoing and other objectives are achieved in accordance with the teachings and principles of the present invention through the provision of a new and improved method for calibrating a workpiece clamping mechanism wherein, for a particular workpiece having, for example, a predetermined thickness dimension, a master calibration block, having a thickness dimension which is predeterminedly less than that of the particular workpiece, is placed beneath the clamping mechanism which is provided with a compressible bumper which is not only adapted to engage the master calibration block during the calibration procedure, but will engage the particular workpiece when the clamping mechanism is subsequently used to securely clamp the workpiece upon the work table or workpiece support surface. In connection with the calibration of the clamping mechanism, it is known that for each unit of compression, as measured in distance or thickness increments, that the material, comprising the compressible bumper, undergoes, the compressible bumper will exhibit or generate a precisely known amount of force or force level. Accordingly, if the compressible bumper generates a force level of, for example, fifty pounds per each ten-thousandths of an inch (0.010") that the compressible bumper is compressed, and if it is desired that the clamping mechanism exert, for example, fifty pounds of force upon the workpiece, then the distance that the compressible bumper must be compressed, when it is engaged with the workpiece, comprises ten-thousandths of an inch (0.010"). Therefore, in accordance with the new and improved calibration method developed in accordance with the principles and teachings of the present invention, the thickness of the master calibration block, that is used to calibrate the particular clamping mechanism, is provided with a thickness dimension which is ten-thousandths of an inch (0.010") smaller or less than the thickness dimension of the particular workpiece. The compressible bumper member of the clamping mechanism is positioned into engagement with the master calibration block and then locked in that position, whereby the calibration process is complete. Accordingly, when the calibrated or adjusted clamping mechanism is then used to clamp the workpiece upon the underlying work table or support surface, in order to properly engage the clamping mechanism upon the workpiece and thereby secure the same to the underlying work table or support surface, the compressible bumper member will have to be compressed ten-thousandths of an inch (0.010") because the thickness dimension of the workpiece is ten-thousandths of an inch (0.010") greater or larger than that of the master calibration block. Therefore, still further, when the clamping mechanism is in fact properly engaged with the workpiece, it is known that a clamping force of precisely fifty pounds will be exerted upon the workpiece. Accordingly, still further, when a plurality of clamping mechanisms are calibrated or adjusted in accordance with the method of the present invention, all of the clamping mechanisms will exert precisely the same level of force upon their respective regions of the workpiece.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
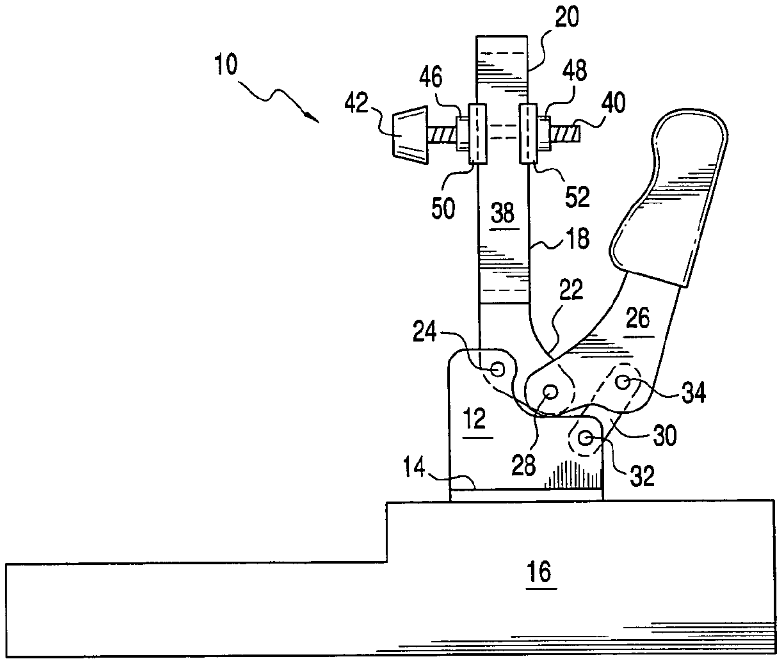
FIG. 1 is a side elevational view of a clamping mechanism, disposed at its FULLY OPEN position at which the bumper member is located remote from the work table or support surface, which may be calibrated in accordance with the new and improved calibration method developed in accordance with the principles and teachings of the present invention, so as to always generate a predetermined level of clamping force.

In order to correctly implement the calibration method of the present invention, the clamping mechanism must be of the type which is capable of attaining a finite or precisely defined final or LOCKED position when it is disposed in its clamped state. Accordingly, with reference being made to FIGS. 1-4 of the drawings, an exemplary embodiment of an adjustable clamping mechanism of the aforenoted type, which attains a finite or precisely defined final or LOCKED position when it is disposed in its clamped state, will be described. More particularly, the adjustable clamping mechanism is generally indicated by the reference character 10, and it is seen that the adjustable clamping mechanism 10 comprises a fulcrum member 12 which has the configuration of an upstanding, flanged bracket, the base portion 14 of which is adapted to be fixedly secured to a work table or support surface 16 by means of suitable threaded fasteners, not shown. A lever arm 18 is seen to comprise a first relatively large arm portion 20, and a second relatively small arm portion 22 integrally connected to the first arm portion 20. In addition, the lever arm 18 is pivotally mounted, by means of a pivotal connection 24 interposed between, or interconnecting, the first relatively large arm portion 20 and the second relatively small arm portion 22, upon an upper section of the fulcrum member 12.

An actuating handle 26 has a first portion thereof pivotally connected to the distal end portion of the second relatively small arm portion 22 of the lever arm 18 as at 28, while a linkage member 30 is pivotally connected at a first end portion thereof to a lower section of the fulcrum member 12 as at 32, and is also pivotally connected at a second end portion thereof to a second portion of the actuating handle 26 as at 34. Therefore, as can readily be appreciated from FIGS. 1 and 2, as the actuating handle 26 is rotated in the clockwise direction CW from its original, FULLY OPEN position as illustrated within FIG. 1, the clockwise rotation of the actuating handle 26 will initially occur substantially around the pivotal connection 34 so as to effectively cause the pivotal connection 28, defined between the first portion of the actuating handle 26 and the distal end portion of the second relatively small arm portion 22 of the lever arm 18, to move upwardly as can best be seen in FIG. 2. The aforenoted upward movement of the pivotal connection 28, defined between the first portion of the actuating handle 26 and the distal end portion of the second relatively small arm portion 22 of the lever arm 18, will therefore cause the second relatively small arm portion 22 of the lever arm 18 to likewise move upwardly and thereby cause the lever arm 18 to begin to rotatably move in the counterclockwise direction CCW such that the first relatively large arm portion 20 of the lever arm 18 will begin to move downwardly and approach a master calibration block 36 which is disposed upon the work table or support surface 16 for the purpose of calibrating the clamping mechanism 10 in accordance with the unique and novel method of the present invention.

Continuing further, it is seen that the first relatively large arm portion 20 of the lever arm 18 is provided with a longitudinally extending slot 38, and that a threaded rod member 40 extends through the slot 38 so as to be disposed or oriented substantially perpendicular to the longitudinal extent of the slot 38. The lower distal end portion of the threaded rod member 40 has a bumper member 42 fixedly mounted thereon which is adapted to engage the upper surface portion 44 of the master calibration block 36 during the calibration process, and it is additionally noted that the bumper member 42 comprises a suitable rubber material which is slightly compressible so as to be capable of tightly engaging a workpiece when the bumper member 42 is forced into contact with the workpiece as a result of a predetermined amount of clamping force being generated by means of the clamping mechananism 10, when the clamping mechanism 10 is moved from its FULLY OPEN position as illustrated within FIG. 1, to its CLOSED and LOCKED position as illustrated within FIG. 4, as a result of the calibration method of the present invention, as will be more fully discussed hereinafter. A pair of nut members 46,48 are threadedly engaged upon the threaded rod member 40 so as to be disposed upon opposite sides of the lever arm 18, and a pair of flanged washers 50,52 are respectively interposed between the nut members 46,48 and the lower and upper edge portions of the lever arm 18. The flanged washers 50,52 comprise flanged-type structures so as to facilitate the stable seating of the same upon the lower and upper edge portions of the lever arm 18, and the flanged washers 50,52 also serve as seat members upon which the nut members 46,48 are adapted to be seated when the nut members 46,48 are threadedly rotated to tightened positions with respect to threaded rod member 40 in conjunction with achieving positional adjustment of the threaded rod member 40, and the bumper member 42 mounted thereon, with respect to the lever arm 18 so as to, in turn, be positionally adjusted with respect to the master calibration block 36 disposed upon the work table or support surface 16, as will be more fully discussed hereinafter.

More particularly, it can be readily appreciated that when the nut members 46,48 are threadedly rotated so as to be loosened or effectively disengaged from their tightly seated positions upon the flanged washers 50,52 whereby, in turn, the flanged washers 50,52 will not be fixedly or tightly seated upon the lower and upper edge portions of the lever arm 18, then axial adjustment of the threaded rod member 40, and that of the bumper member 42 mounted thereon, can be achieved with respect to the lever arm 18. In this manner, the axial disposition of the threaded rod member 40, and that of the bumper member 42 mounted thereon, with respect to the work table or support surface 16, and with respect to the master calibration block 36 disposed thereon, can be achieved. Subsequent threaded tightening of the nut members 46,48 of course effectively locks the threaded rod member 40, and the bumper member 42 mounted thereon, at the predetermined axially adjusted position.

Still further, when the nut members 46,48 are disposed at their aforenoted threadedly loosened or disengaged positions with respect to the threaded rod member 40, the entire assembly, comprising the threaded rod member 40 and the bumper member 42 mounted thereon, the pair of nut members 46,48, and the pair of flanged washers 50,52, can be adjustably positioned in a transversely oriented manner along the longitudinal extent of the slot 38 as a result of the flanged washers 50,52 effectively moving along the lower and upper edge portions of the lever arm 18 while the threaded rod member 40 moves transversely within the slot 38. Subsequently, when the entire assembly, comprising the threaded rod member 40 and the bumper member 42 mounted thereon, the pair of nut members 46,48, and the pair of flanged washers 50,52, then reaches the desired lateral or transverse disposition such that the bumper member 42 is located at a predetermined lateral or transverse position with respect to the work table or support surface 16, and with respect to the master calibration block 36 disposed thereon, the nut members 46,48 can be threadedly tightened with respect to the rod member 40 so as to cause the flanged washers 50,52 to be tightly seated upon the lower and upper edge portions of the lever arm 18 and, in turn, to cause the nut members 46,48 to be respectively tightly seated upon the flanged washers 50,52. Positional adjustment of the threaded rod member 40, and that of the bumper member 42 mounted thereon, with respect to the lever arm 18, and in turn, with respect to the work table or support surface 16, and with respect to the master calibration block 36 disposed thereon, is therefore able to be achieved in accordance with two degrees of freedom, that is, both axially and transversely.

Figure 2:
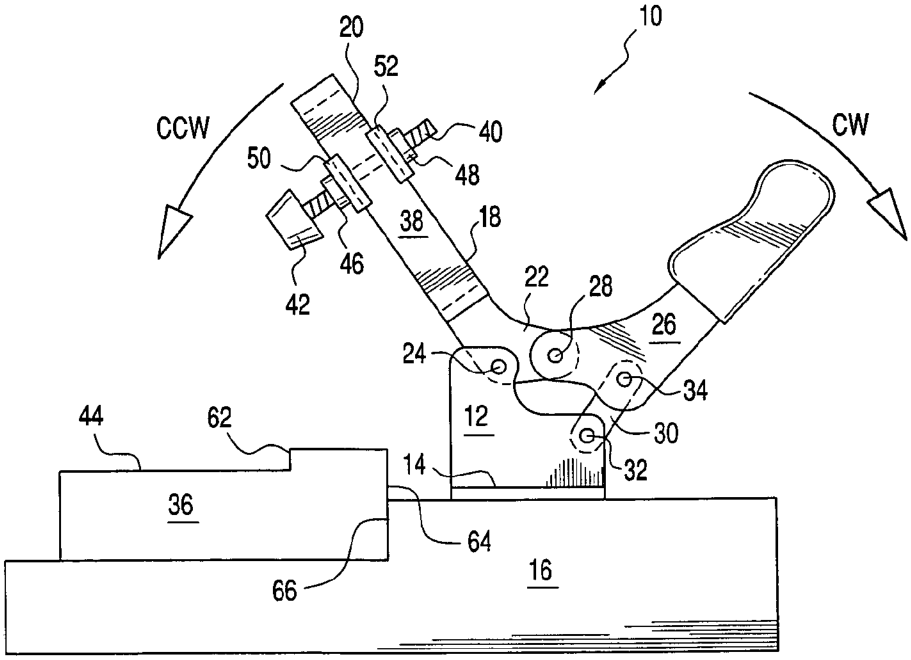
FIG. 2 is a side elevational view, corresponding to that of FIG. 1, showing, however, the clamping mechanism disposed at an INTERMEDIATE OPEN position at which the bumper member is beginning to approach the work table or support surface upon which the master calibration block is located.
Figure 3:
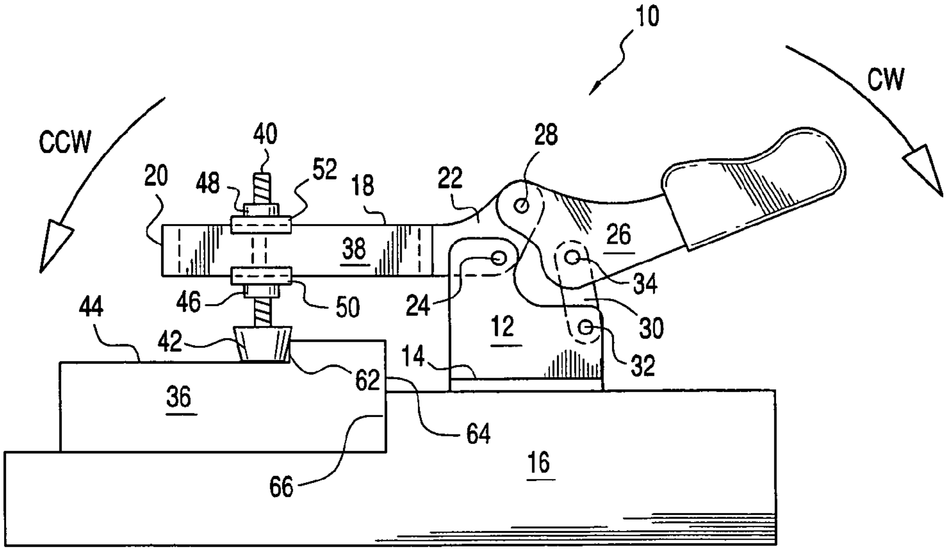
FIG. 3 is a side elevational view, corresponding to those of FIGS. 1 and 2, showing, however, the clamping mechanism disposed at its CLOSED, but UNLOCKED position at which the bumper member is disposed in engaged contact with the master calibration block located upon the work table or support surface.

With reference now being made to FIG. 3, as the actuating handle 26 is rotated further in the clockwise direction CW from the position illustrated within FIG. 2, the pivotal connection 28 will effectively move upwardly while the linkage member 30 will rotate in the counterclockwise direction CCW so as to effectively attain a substantially vertical orientation such that the pivotal connections 32,34 are effectively disposed within a vertical plane with respect to each other. As was the case illustrated within FIG. 2, the aforenoted upward movement of the pivotal connection 28, defined between the first portion of the actuating handle 26 and the distal end portion of the second relatively small arm portion 22 of the lever arm 18, will therefore cause the second relatively small arm portion 22 of the lever arm 18 to likewise move upwardly and thereby cause the lever arm 18 to continue to rotatably move in the counterclockwise direction CCW such that the first relatively large arm portion 20 of the lever arm 18 will move downwardly still further and be disposed adjacent to the master calibration block 36 disposed upon the work table or support surface 16. At this point in time, the first relatively large arm portion 20 of the lever arm 18 is disposed in a substantially, but not entirely, horizontal disposition wherein the clamping mechanism 10 is disposed in its CLOSED but UNLOCKED position. Subsequently, when the actuating handle 26 is moved still further in the clockwise direction CW, the pivotal connection 28 will effectively move upwardly an additionally small distance, the second relatively small arm portion 22 of the lever arm 18 will likewise move upwardly an additionally small distance, and therefore the lever arm 18 will be caused to rotate slightly in the counterclockwise direction CCW such that the first relatively large arm portion 20 of the lever arm 18 will move downwardly a slight distance whereby the arm 18 will now be disposed in a substantially true horizontal orientation wherein the lower surface portion of the bumper member 42 will be disposed in contact with the upper surface portion 44 of the master calibration block 36.

In addition, the linkage member 30 will have been rotated in the counterclockwise direction CCW such that the pivotal connection 34 will have effectively attained an over-center locking position with respect to the pivotal connection 32. Still further, the corner region of the actuating handle 26, within which the pivotal connection 34 is located, is now in abutment with, or seated within, the recessed region 54 of the fulcrum member 12. Accordingly, the clamping mechanism 10 is now disposed in its CLOSED and LOCKED position. More importantly, the aforenoted CLOSED and LOCKED position attained by means of the clamping mechanism 10 defines a finite or precisely defined, repeatable position. In other words, once the disposition or positional adjustment of the threaded rod member 40, and that of the bumper member 42 mounted thereon, is achieved with respect to the lever arm 18, and in turn, with respect to the master calibration block 36 disposed upon the work table or support surface 16, in accordance with the principles and teachings of the calibration method of the present invention, the positional location or disposition of the bumper member 42 with respect to the work table or support surface 16, upon which a workpiece to be clamped will be disposed, will always be the same so as to always exhibit or generate the same, constant-level, repeatable compression or clamping force.

Continuing further then, in accordance with the unique and novel calibration method developed in conjunction with the principles and teachings of the present invention, when the method for calibrating the clamping mechanism 10 in connection with a particular workpiece is to be initiated, the thickness dimension of the particular workpiece is initially determined, and in addition, the precise amount of the clamping force, which is to be generated by means of the clamping mechanism 10 when the clamping mechanism 10 is to clamp the workpiece to the underlying work table or support surface 16, is also initially determined. As has been noted hereinbefore, it is known that the compressible bumper member 42 will generate a predetermined amount of clamping force per a predetermined amount of compression that the compressible bumper member 42 undergoes. Therefore, the master calibration block 36 is chosen to have a thickness dimension, which is less than the thickness dimension of the particular workpiece, by precisely the amount or distance that the compressible bumper member 42 is to be compressed, so as to generate the desired clamping force to be impressed upon the workpiece, when the compressible bumper member 42 compressibly engages the workpiece as a result of the clamping mechanism 10 being used to clamp the workpiece to the underlying work table or support table 16. This calibration technique can best be understood as a result of reference being made to FIGS. 5 and 6.

Figure 6:
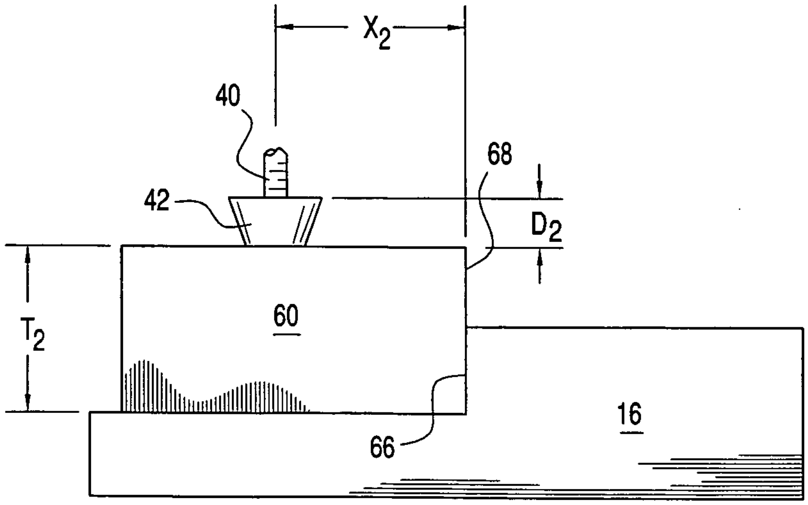
FIG. 6 is a side elevational view schematically illustrating the clamping of a workpiece, having a thickness dimension $T_2$, upon the work table or support surface by means of the clamping mechanism, which has already been calibrated in accordance with the calibration method of the present invention utilizing the master calibration block having the thickness dimension of $T_1$ as illustrated within FIG. 5, wherein the bumper member of the clamping mechanism has now been compressed to a depth dimension $D_2$ so as to generate a predetermined amount of clamping force upon the workpiece.

More particularly, the workpiece to be ultimately clamped to the underlying work table or support surface 16 by means of the clamping mechanism 10 is illustrated at 60 in FIG. 6 and is seen to have a thickness dimension $T_2$ which may be, for example, one-half inch (0.500"). It is also predetermined that the desired clamping force, by means of which the clamping mechanism 10 is to clamp the workpiece 60 to the underlying work table of support surface 16 is to be fifty pounds. It is further known that, for the specific compressible material comprising the compressible bumper member 42, if, for example, the compressible bumper member 42 is compressed ten-thousandths of an inch (0.010"), then the compressible bumper member 42 will generate a compression force of fifty pounds. Therefore, in accordance with the calibration method or technique developed in accordance with the principles and teachings of the present invention, the master calibration block 36 is selected to have a thickness dimension $T_1$ which is less than the thickness dimension $T_2$ of the workpiece 60 by an amount equal to ten-thousandths of an inch (0.010"), or in other words, the thickness dimension $T_1$ of the master calibration block 36 is selected to be four hundred ninety thousandths of an inch (0.490"). Accordingly, when the calibration process for the clamping mechanism 10 is to be initiated, the master calibration block 36 is initially positioned upon the work table or support surface 16, and the assembly comprising the threaded rod member 40, and the bumper member 42 disposed thereon, are disposed in a loosened state upon the lever arm 18 of the clamping mechanism 10 as a result of the nut members 46,48 not being disposed in a tightened or engaged state with the upper and lower edge portions of the lever arm 18. In this manner, the threaded rod member 40, and the bumper member 42 disposed thereon, are vertically movable, or in other words, the threaded rod member 40 and the bumper member 42 may be vertically adjusted with respect to the lever arm 18. Therefore, when the clamping mechanism 10 is disposed in its CLOSED and LOCKED position, which defines the aforenoted finite or precisely defined, repeatable position, the threaded rod member 40, and the bumper member 42 disposed thereon, may be freely moved vertically so as to bring the lower or undersurface portion of the bumper member 42 into firm, but not compressed, engagement with the upper surface portion 44 of the master calibration block 36. The nut members 46,48 are then respectively threadedly tightened against the lower and upper edge portions of the lever arm 18 thereby locking the threaded rod member 40, and the bumper member 42 disposed thereon, in the adjusted or calibrated position. This completes the calibration procedure. The locking mechanism 10 may then be opened to, for example, either its FULLY OPENED position as illustrated within FIG. 1, or to its INTERMEDIATE OPENED position as illustrated within FIG. 2. In either case, the master calibration block 36 may be removed from the work table or support surface 16 and the workpiece 60 may be deposited upon the work table or support surface 16.

Figure 4:
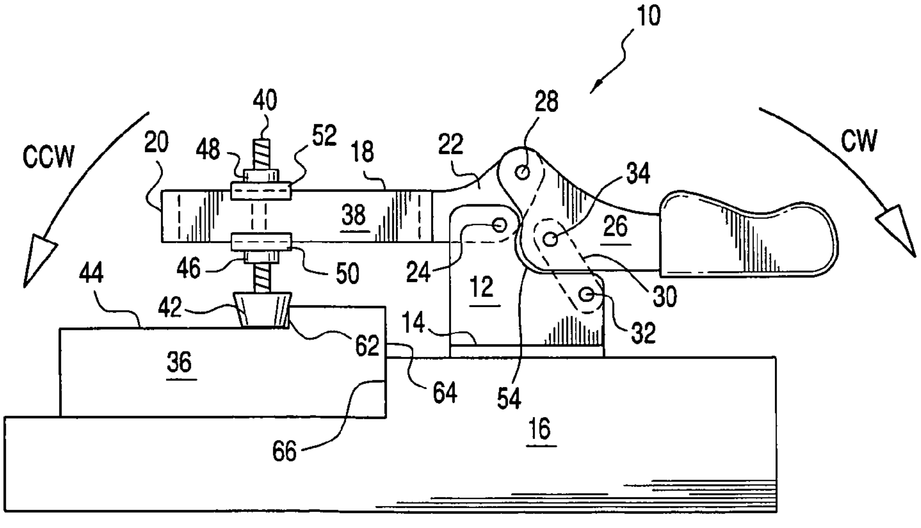
FIG. 4 is a side elevational view, corresponding to those of FIGS. 1-3, showing, however, the clamping mechanism disposed at its CLOSED and LOCKED position at which the bumper member is disposed in engaged contact with the master calibration block located upon the work table or support surface such that the clamping mechanism is properly calibrated so as to always generate a predetermined amount of clamping force in connection with a particular workpiece having a predetermined or particular thickness dimension.

It is therefore to be appreciated that when the workpiece 60 is in fact deposited upon the work table or support surface 16, and when the clamping mechanism 10 is again moved to its CLOSED and LOCKED position as illustrated within FIG. 4, the clamping mechanism 10 will not be permitted to achieve its CLOSED and LOCKED position illustrated within FIG. 4, unless the bumper member 42 undergoes a predetermined amount of compression, due to the greater thickness dimension $T_2$ of the workpiece 60 as compared to the thickness dimension $T_1$ of the master calibration block 36, wherein the predetermined amount of compression that the bumper member 42 will in fact undergo will be precisely equal to the difference between the thickness dimension $T_2$ of the workpiece 60 as compared to the thickness dimension $T_1$ of the master calibration block 36. In particular, the bumper member 42, having a non-compressed thickness or depth dimenion $D_1$, and having undergone compression as a result of being forced into engaged contact with the workpiece 60 by means of the clamping mechanism being moved to its CLOSED and LOCKED position, will now have a thickness or depth dimension $D_2$ which is precisely the difference between the respective thickness dimensions $T_1$,$T_2$ of the master calibration block 36 and workpiece 60.

Therefore, due to such compression of the bumper member 42, the predetermined clamping force, which is a function of the degree to which the compressible bumper member 42 has in fact been compressed, as has been discussed hereinbefore, will be impressed upon the workpiece 60, thereby securely clamping the workpiece 60 upon the underlying work table or support surface 16. It is to be appreciated further that when a plurality of clamping mechanisms 10 are calibrated utilizing the aforenoted master calibration block 36, and in accordance with the aforenoted calibration method or technique developed in accordance with the principles and teachings of the present invention, all of the clamping mechanisms 10 will automatically be calibrated to precisely the same, repeatable degree whereby each one of the clamping mechanisms 10 will be able to generate the same precise amount of clamping force upon all regions of the workpiece 60 provided, of course, that all of the regions of the workpiece 60 have the same thickness dimension $T_2$. It is additionally noted, in conjunction with achieving the repeatedly uniform clamping forces, that the clamping force will also be dependent upon the lateral or transverse distance that the threaded rod member 40, and the bumper member 42 disposed thereon, are located from the pivotal connection 24 in view of the fact that such distance effectively defines the moment arm through which the rotary or pivotal assembly, comprising the threaded rod member 40 and the bumper member 42, moves. Therefore in order to achieve the aforenoted repeatable uniform clamping forces, it is further desired that the threaded rod member 40, and the bumper member 42 disposed thereon, are always located at a predetermined position along the lever arm 18.

Figure 5:
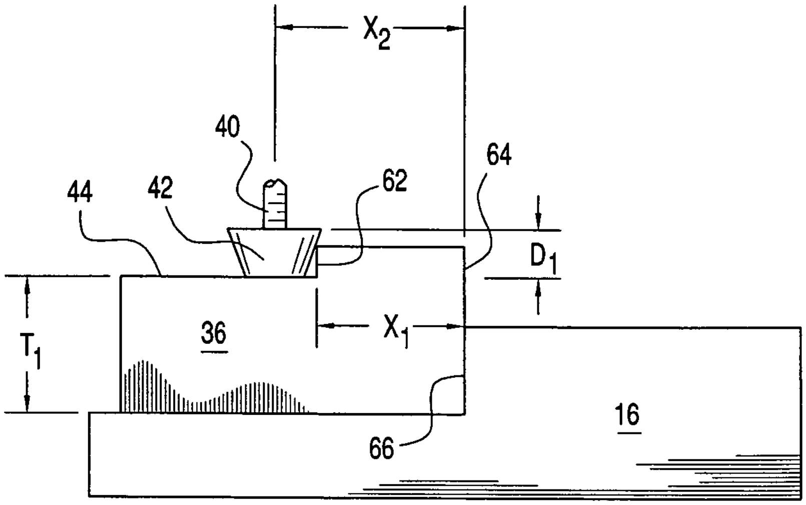
FIG. 5 is a side elevational view schematically illustrating the calibration of the clamping mechanism, having a compressible bumper member characterized by means of the non-compressed depth dimension $D_1$, in accordance with the calibration method of the present invention utilizing the master calibration block having a thickness dimension of $T_1$.

Accordingly, it is further seen that the master calibration block 36 is provided with, for example, an upstanding lip member or step 62 which is located a predetermined distance $X_1$ from the right side edge portion 64 of the master calibration block 36 which will be disposed in contact with the upstanding wall portion 66 of the work table or support surface 16, as can best be seen in FIG. 5. Since each one of the clamping mechanisms 10 will be fixed upon the work table or support surface 16 at the same positions relative to the upstanding wall portion 66 of the work table or support surface 16, then in addition to the threaded rod member 40, and the bumper member 42 disposed thereon, being vertically adjusted, as has been noted hereinbefore, if the threaded rod member 40, and the bumper member 42 disposed thereon, were also laterally or transversely adjusted along the longitudinal extent of the lever arm 18 until the bumper member 42 was disposed in contact with the upstanding lip member or step 62 of the master calibration block 36, then the longitudinal axis of the threaded rod member 40 would be located a predetermined distance $X_2$ from the right side edge portion 64 of the master calibration block 36 or from the upstanding wall portion 66 of the work table or support surface 16. Accordingly, when the master calibration block 36 is removed from the work table or support surface 16, and the workpiece 60 is subsequently disposed upon the work table or support surface 16, the threaded rod member 40, and the bumper member 42 disposed thereon, will be disposed the predetermined distance $X_2$ from the side edge portion 68 of the workpiece 60 as disclosed within FIG. 6. It is to be appreciated that since the transverse dimension $X_1$ of the upstanding lip member 62 of the master calibration block 36 effectively determines the distance $X_2$ at which the threaded rod member 40 will be located from the side edge portion 64 of the master calibration block 36, or from the upstanding wall portion 66 of the work table or support surface 16, then the transverse dimension $X_1$ is selected depending upon the predetermined distance $X_2$ defined between the location, at which it is desired that the bumper member 42 will engage upon the workpiece 60, and the side edge portion 68 of the workpiece 60.

It is lastly noted that, when the plurality of clamping mechanisms 10 are utilized to securely clamp the workpiece 60 upon the underlying work table or support surface 16, not only will all of the clamping mechanisms 10 generate the same clamping forces upon the different regions of the workpiece 60, but in addition, the workpiece 60 is in fact securely clamped upon the underlying work table or support surface 16 whereby the clamping forces of the plurality of clamping mechanisms 10 will be not be inadvertently compromised. This is true because the only way to release any one of the clamping mechanisms 10 is to rotate the actuating handle 26 in the counterclockwise direction CCW. Any tendency to release the workpiece 60 from the underlying work table or support surface 16 by rotating the lever arm 18 in the clockwise direction, without firstly moving the actuating handle 26 in the counterclockwise direction CCW, will be positively prevented because upward movement of the first relatively large arm portion 20 of the lever arm 18, from its position illustrated within FIG. 4, will cause a corresponding downward movement of the second relatively small arm portion 22 of the lever arm 18 which would, in turn, force that portion of the actuating handle 26, upon which the pivotal connection 34 is located, to be forcefully engaged with that portion of the fulcrum member 12 within which the pivotal connection 32 is located.

Thus, it may be seen that in accordance with the principles and teachings of the present invention, there has been disclosed a new and improved method for calibrating clamping mechanisms utilizing a master calibration block, wherein once the clamping mechanisms are calibrated, all of the clamping mechanisms will generate a predetermined constant force which can be impressed upon a workpiece so as to securely clamp all regions of the workpiece upon a work table or support surface with a predetermined amount of force or force level.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A method for calibrating a clamping mechanism, to be used for clamping a workpiece upon a support surface with a predetermined clamping force, comprising the steps of:

determining the thickness dimension of a particular workpiece to be clamped upon a support surface;

predetermining the amount of clamping force to be generated by a clamping mechanism when the clamping mechanism is clampingly engaged with the particular workpiece so as to securely clamp the particular workpiece upon said support surface by means of said predetermined clamping force;

utilizing a clamping mechanism which can generate a predetermined amount of clamping force as a function of an incremental degree to which said clamping mechanism is to be compressed;

inserting a master calibration block, having a thickness dimension which is less than said thickness dimension of said particular workpiece by an amount which is equal to said incremental degree to which said clamping mechanism is to be compressed, upon said support surface;

movably adjusting said clamping mechanism, with respect to said master calibration block disposed upon said support surface, in a first direction until said clamping mechanism is disposed at a position with respect to said master calibration block wherein said clamping mechanism is disposed in non-compressed contact with said master calibration block disposed upon said support surface; and locking said clamping mechanism at said adjusted position with respect to said master calibration block, whereby when said locked and calibrated clamping mechanism is used to clamp said particular workpiece, having said thickness dimension which is greater than said thickness dimension of said master calibration block by said amount which is equal to said incremental degree to which said clamping mechanism is to be compressed so as to generate said predetermined amount of clamping force, upon said support surface, said calibrated clamping mechanism will undergo said incremental degree of compression equal to the difference between said thickness dimensions of said master calibration block and said particular workpiece so as to generate said predetermined amount of clamping force upon said workpiece disposed upon said support surface and thereby securely clamp said workpiece upon said support surface.

2. The method as set forth in claim 1, further comprising the step of:

utilizing a clamping mechanism which has a finite, precisely defined, repeatable, final clamping position.

3. The method as set forth in claim 2, further comprising the step of:

utilizing a clamping mechanism which has an over-center locking mechanism for locking said clamping mechanism at said finite, precisely defined, repeatable, final clamping position.

4. The method as set forth in claim 1, further comprising the step of:

utilizing a clamping mechanism which has a compressible member, for engaging said master calibration block and said particular workpiece, which is capable of undergoing incremental degrees of compression so as to generate predetermined amounts of clamping force as a function of said incremental degrees to which said compressible member is compressed.

5. The method as set forth in claim 1, further comprising the step of:

movably adjusting said clamping mechanism in a second direction, substantially perpendicular to said first direction, such that said clamping mechanism will be disposed in contact with said master calibration block at a predetermined position defined upon said master calibration block so as to, in turn, be disposed in contact with said particular workpiece at a predetermined position defined upon said particular workpiece.

6. The method as set forth in claim 5, further comprising the step of:

utilizing clamping mechanisms which respectively have compressible members, for engaging said master calibration block and said particular workpiece, which are capable of undergoing incremental degrees of compression so as to generate said predetermined amounts of clamping force as a function of said incremental degrees to which said compressible members are compressed.

7. A method for calibrating a plurality of clamping mechanisms, to be used for clamping different regions of a workpiece, having the same thickness dimension, upon a support surface with a predetermined clamping force, comprising the steps of:

determining the thickness dimension of a particular workpiece to be clamped upon a support surface;

predetermining the amount of clamping force to be generated by a clamping mechanism when the clamping mechanism is clampingly engaged with the particular workpiece so as to securely clamp the particular workpiece upon said support surface by means of said predetermined clamping force;

utilizing a first clamping mechanism which can generate a predetermined amount of clamping force as a function of an incremental degree to which said first clamping mechanism is to be compressed;

inserting a master calibration block, having a thickness dimension which is less than said thickness dimension of said particular workpiece by an amount which is equal to said incremental degree to which said first clamping mechanism is to be compressed, onto said support surface;

movably adjusting said first clamping mechanism, with respect to said master calibration block disposed upon said support surface, in a first direction until said first clamping mechanism is disposed at a position with respect to said master calibration block wherein said first clamping mechanism is disposed in non-compressed contact with said master calibration block disposed upon said support surface;

locking said first clamping mechanism at said adjusted position with respect to said master calibration block; and repeating said steps of utilizing clamping mechanisms which can generate predetermined amounts of clamping force as a function of incremental degrees to which said clamping mechanisms are to be compressed; inserting said master calibration block onto said support surface and movably adjusting each one of said plurality of clamping mechanisms, with respect to said master calibration block disposed upon said support surface, in said first direction, until each one of said plurality of clamping mechanisms is disposed at a position with respect to said master calibration block wherein each one of said plurality of clamping mechanisms is disposed in non-compressed contact with said master calibration block disposed upon said support surface; and locking each one of said plurality of clamping mechanisms at said adjusted position with respect to said master calibration block, whereby when said plurality of locked and calibrated clamping mechanisms are used to clamp said particular workpiece, having said thickness dimension which is greater than said thickness dimension of said master calibration block by said amount which is equal to said incremental degree to which each one of said plurality of clamping mechanisms is to be compressed so as to generate said predetermined amount of clamping force, upon said support surface, each one of said calibrated clamping mechanisms will undergo said incremental degree of compression equal to the difference between said thickness dimensions of said master calibration block and said particular workpiece so as to generate said predetermined amount of clamping force upon said workpiece disposed upon said support surface whereby all of the different regions of said workpiece will be clamped with the same level of clamping force so as to thereby securely clamp said workpiece upon said support surface.

8. The method as set forth in claim 7, further comprising the step of:

utilizing clamping mechanisms which have finite, precisely defined, repeatable, final clamping positions.

9. The method as set forth in claim 8, further comprising the step of:

utilizing clamping mechanisms which have over-center locking mechanisms for respectively locking said clamping mechanisms at said finite, precisely defined, repeatable, final clamping positions.

10. The method as set forth in claim 7, further comprising the step of:

movably adjusting each one of said clamping mechanisms in a second direction, substantially perpendicular to said first direction, such that said clamping mechanisms will be disposed in contact with said master calibration block at predetermined positions upon said master calibration block so as to, in turn, be disposed in contact with said particular workpiece predetermined positions upon said particular workpiece.

* * * * *